UNITED STATES PATENT OFFICE.

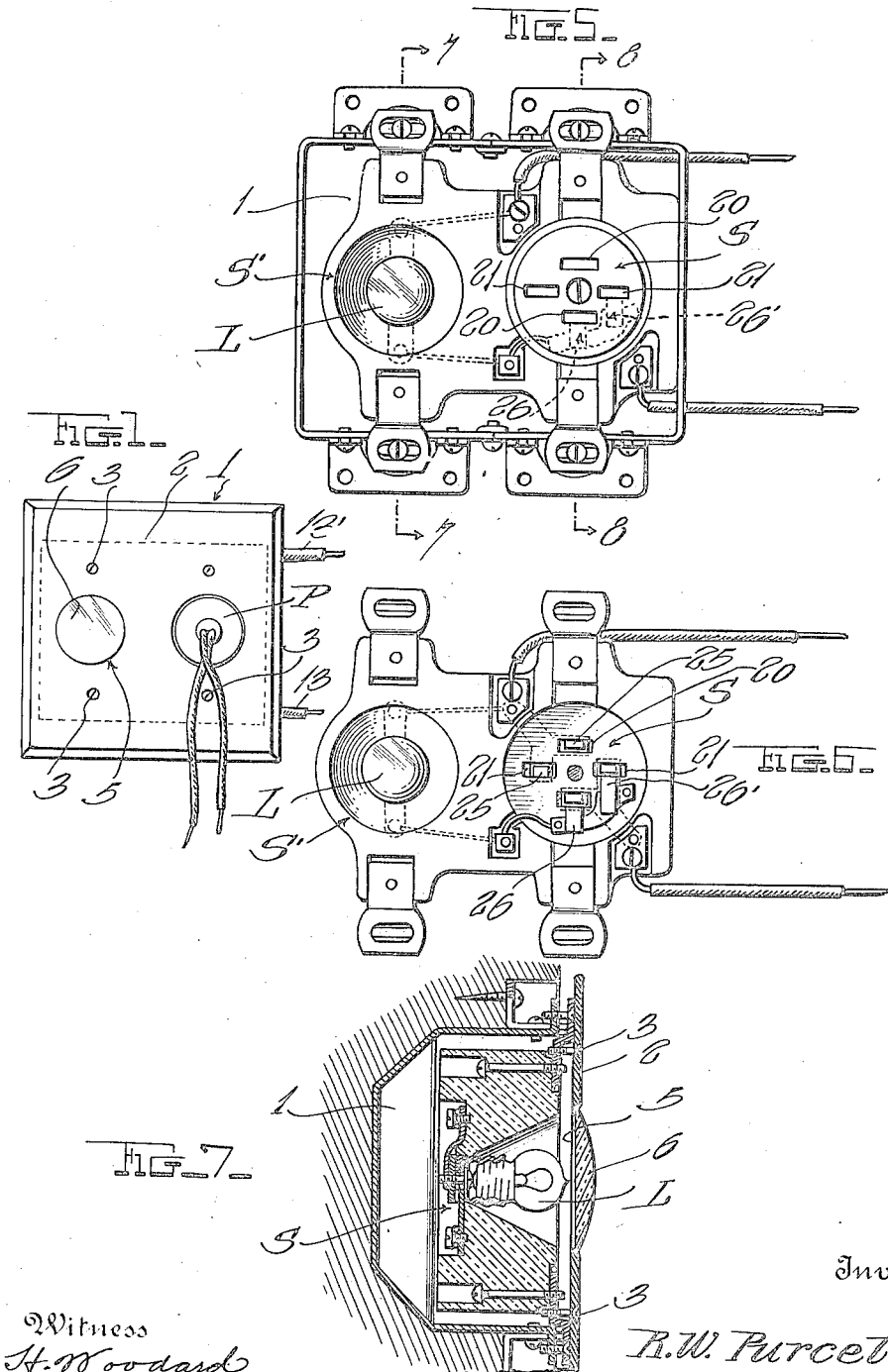

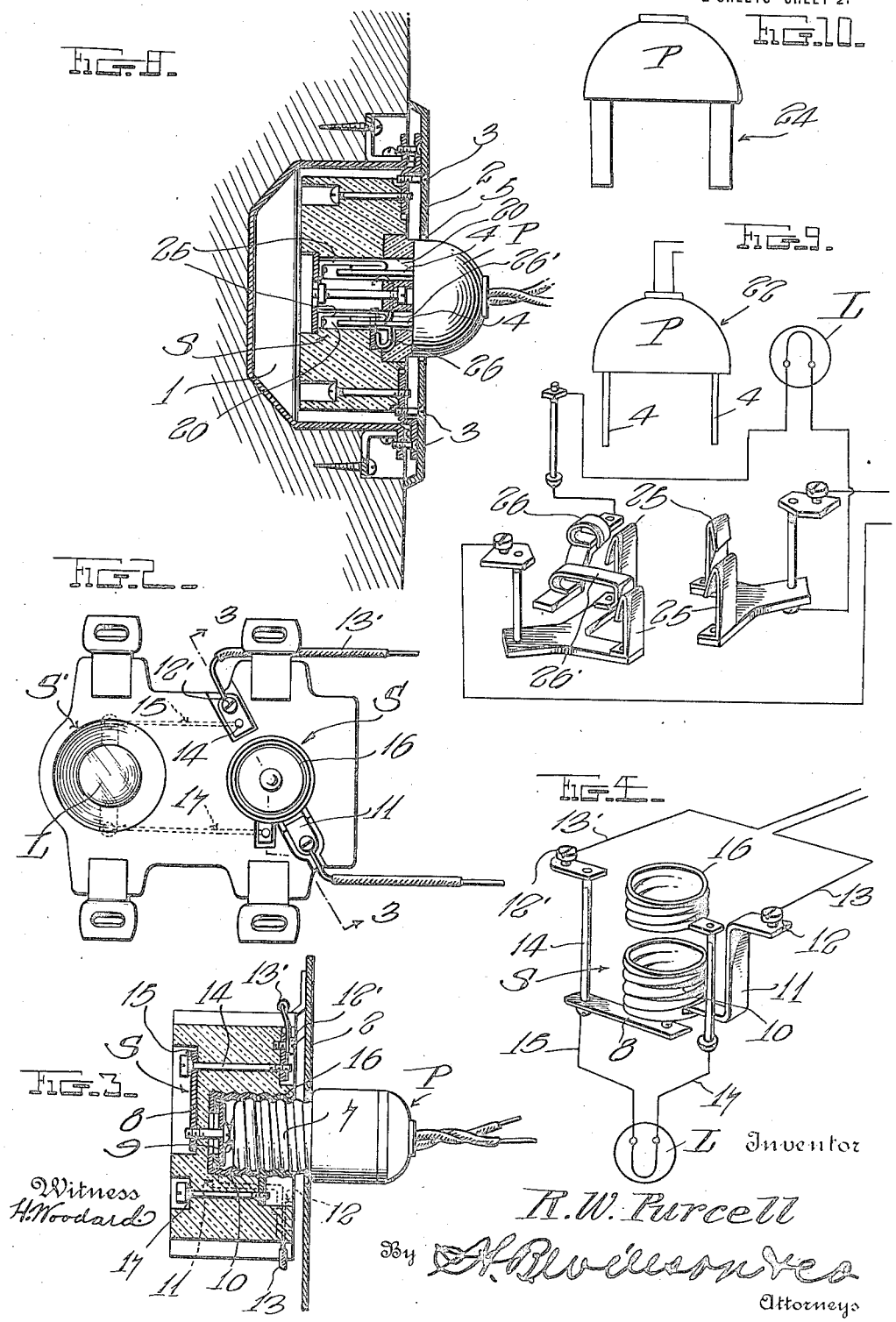

ROY WM. PURCELL, OF ST. PAUL, MINNESOTA.

ELECTRIC FIXTURE.

1,248,161. Specification of Letters Patent. Patented Nov. 27, 1917.

Application filed February 1, 1917. Serial No. 145,916.

*To all whom it may concern:*

Be it known that I, ROY W. PURCELL, a citizen of the United States, residing at St. Paul, in the county of Ramsey and State of Minnesota, have invented certain new and useful Improvements in Electric Fixtures; and I do declare the following to be a full, clear, and exact description of the invention, such as will enable others skilled in the art to which it appertains, to make and use the same.

This invention relates to improvements in electrical devices, particularly to wall sockets and the like whereby electric lamps and appliances may be easily and quickly attached to or detached from the source of supply.

The principal object of the invention is to provide a device of this character equipped with a pilot light which will indicate whenever any current is being conveyed from the socket to the appliance.

Still another object is to provide a very simply constructed device of this character which may be readily inclosed in an ordinary or suitable form of housing, whereby to protect the mechanism.

With these and other objects in view, the invention resides in the novel features of construction, combination, and arrangement of parts which will be hereinafter more particularly described and claimed and shown in the drawings wherein:

Figure 1 is a face view of a junction box inclosing an electrical device constructed in accordance with my invention;

Fig. 2 is a plan view of said device removed from the junction box;

Fig. 3 is a vertical transverse section on the line 3—3 of Fig. 2;

Fig. 4 is a diagrammatic perspective view showing more particularly the arrangement of the various parts of the invention;

Fig. 5 is a plan view of a slightly modified form of my invention, the same being inclosed in a junction box from which the cover has been removed;

Fig. 6 is a plan view partly in section of this modified form of my invention removed from said box;

Figs. 7 and 8 are vertical transverse sections on the planes of the lines 7—7 and 8—8 of Fig. 5;

Fig. 9 is a diagrammatic perspective view showing the arrangement of the various contact members in the modified form, the appliance plug P having its contact members arranged parallel with each other; and Fig. 10 is a detail view of a slightly different appliance plug P having its contact members disposed in tandem.

From the several forms of my invention shown in the accompanying drawings it is obvious that the idea of providing means for indicating when electricity is being taken from a certain socket, may be embodied in many different types of fixtures. However, in all of these cases the pilot light and the socket are preferably inclosed within a suitable metallic junction box 1 shaped to fit the parts housed therein. This box may be disposed at any suitable point where it is desired that a connection may be readily made with the source of supply of electricity, for instance in the wall or floor of a room. In order that access may be readily attained to the interior of the casing, a cover plate 2 is provided, the same preferably being held in place by fastening elements 3.

As is usual in devices of this character a connection is made between the socket S disposed within the casing 1 and the appliance or lamp by a plug P, the same either having a threaded portion for insertion within the socket, or spring fingers. In Figs. 1 to 4 is illustrated a socket for the reception of a screw plug P, while in Figs. 8 and 9 is shown a socket constructed to receive a plug having spring fingers in the form of jack blades 4.

The socket S in both forms is preferably made of porcelain or other insulating material and has a supplemental electric lamp socket S' formed integrally therewith, the latter receiving the screw threaded base portion of the pilot light L. The electrical connections between the two sockets which consists of suitable conductors, are preferably embodied in the porcelain forming the same. As shown in the drawings, the pilot light L is of rather small size and positioned almost wholly within the casing 1, an opening 5 being formed in the cover 2 thereof so that the rays of light from the lamp may be projected outwardly. In order to protect the lamp L a lens 6 of heavy transparent glass is secured over the opening 5.

The socket S illustrated in the first mentioned series of figures is substantially cylindrical to receive the cylindrical portion 7 of the screw plug P. In the bottom of this socket is positioned the usual stationary or spring pressed contact member 8 which is adapted to engage the contact portion 9 of the bottom of the screw plug. Around the inner portion of the wall of this socket is disposed an annular sleeve-like contact member 10 which is usually of thin sheet brass and has its inner wall screw threaded for the reception of the screw threads of the cylindrical portion 7.

An electrical connection in the form of the conductor 11 extends through the porcelain base in which the socket is formed and connects the contact member 10 with a binding post 12, to which one of the line wires 13 is connected. The other line wire 13' runs to a second binding post 12' to which the other contact member 8 is connected by the conductor 14. From the above it will be noted that when the screw plug has its cylindrical portion 7 inserted within the socket until the contact 9 engages the contact 8 in the bottom of the socket, the electricity will flow from one of the line wires through the binding post to which it is connected, along the conductor to one of the contact members in the socket, and from there through the plug and the appliance which is connected thereto. From the appliance it flows back to the plug, through the other contact within the socket and out through the line wire.

One terminal of the lamp socket S' in this form of the device is connected by the wire 15 to the binding post 12' or directly to the line wire 13', while the other terminal of this lamp socket is electrically connected with a supplemental contact member 16, by the conductor 17. In the present instance this supplemental contact 16 is in the form of a ring-like sheet metal member of a diameter similar to that of the contact member 10 and is disposed within the same socket but at a point adjacent the outer end thereof. The inner edge of this supplemental contact is spaced from the outer edge of the main contact 10 and is clearly illustrated in Figs. 3 and 4. The supplemental contact 16 is also internally screw threaded to receive the screw threads of the cylindrical portion 7 of the plug. Thus as soon as the plug is inserted within the socket and the gap between the contact members 10 and 16 bridged, the pilot lamp will be lighted. By the arrangement of the parts as described it is seen that an appliance cannot be operated with current supplied through a plug inserted in one of these receptacles without lighting the pilot light.

In Figs. 5 to 9, a second form of my invention is shown. In this form the plug P provided with the jack blades 4 is used. The socket to receive these blades is formed in a porcelain base as in the other device, and the pilot lamp socket is also formed in the base. There are two forms of plugs having jack blades for engaging spring fingers within the sockets, in one of which said blades are arranged parallel with each other and in the other in tandem. The present socket is so constructed that it will receive either of these forms of plugs.

In other words, the socket is provided with four openings, one pair 20 being disposed in parallel while the other pair 21 is arranged in tandem or in substantially the same longitudinal plane. A plug having blades to be disposed in the openings 20 is illustrated at 22 in Fig. 9, and a modified form of plug having blades for disposition in the other openings 21 is illustrated in Fig. 10, and designated by the numeral 24. Each of these plugs is connected to a suitable appliance or lamp.

When the blades 4 of either form of plug are inserted in the socket, they engage spring fingers 25 positioned in the interior thereof, the outer ends of these fingers being spaced from the outer ends of the openings. Suitable electrical connections unite these spring fingers with the source of electrical supply so that the current will flow from the line through the socket and the plug to the appliance and back again.

In one of the openings 20 is positioned a supplemental contact finger 26 which is connected by a conductor to one of the terminals of the pilot lamp socket disposed in the casing inclosing the base in which these parts are formed. The other terminal of said pilot lamp socket is connected directly to one of the binding posts to which one of the line wires is attached. A similar supplemental contact finger 26' is placed in one of the other openings 21 and is also connected to the first mentioned terminal of the pilot lamp socket. Both of the contact fingers 26 and 26' are spaced outwardly from the outer ends of the contact fingers 25 so that when either of the plugs 23 or 24 have their jack blades inserted within the openings 20 or 21, an electrical connection is completed between the line wires and the pilot lamp in addition to the circuit between the appliance and said line wires. Thus, as in the first described form, the pilot light will indicate when current is flowing from the line wires through the socket and plug.

Various other forms of the invention might be illustrated, but it is believed that these two forms sufficiently show the idea. Whatever the form, it is contemplated to position the various contact members in the relative positions illustrated in the several figures of the drawing, in which the supplemental and main contacts are successively engaged by the contacts carried by the movable plugs.

I claim:

1. The combination with a pilot lamp; of a socket, a pair of main contact members in the lower portion of said socket, an electrical connection between one terminal of said pilot lamp and one of said contact members, a supplemental contact member spaced outwardly from the other contact members, an electrical connection between the other terminal of the pilot lamp and said supplemental contact member, and an appliance plug carrying contacts for successively engaging said supplemental contact member and the pair of contact members, whereby to bridge the gap between the same to light the pilot lamp.

2. The combination with a pilot lamp, of a socket, a pair of spaced spring fingers in the lower portion of said socket, an electrical connection between one terminal of said pilot lamp and one of said spring fingers, a supplemental spring finger in said socket and spaced outwardly from the other fingers, an electrical connection between the other terminal of the pilot lamp and said supplemental spring finger, and an appliance plug carrying spaced contact blades for successively engaging said supplemental finger and the pair of spring fingers, whereby to bridge the gap between the same to light said pilot lamp.

In testimony whereof I have hereunto set my hand in the presence of two subscribing witnesses.

ROY WM. PURCELL.

Witnesses:
   A. G. MacKay,
   Robt. Buer.